Oct. 17, 1967 W. C. AVREA 3,347,341
TRANSMISSION CASE COVER
Filed Oct. 24, 1965

WALTER C. AVREA
INVENTOR.

BY Beehler & Arant
ATTORNEYS.

United States Patent Office 3,347,341
Patented Oct. 17, 1967

3,347,341
TRANSMISSION CASE COVER
Walter C. Avrea, 539 Lucerne Ave.,
Placentia, Calif. 92670
Filed Oct. 24, 1965, Ser. No. 504,809
4 Claims. (Cl. 184—1)

The invention relates to an inspection device capable of performing a double function, namely that of collecting dirt particles which may accumulate in the bath of oil in which gears operate and also that of making it possible to inspect the interior of a housing in which such gears operate from the outside without it being necessary to open up the housing as for example by removal of a cover.

Typical examples of mechanisms which operate in a bath of oil are those associated with automotive vehicles and these include transmission housings and differential housings in which there is a series of toothed gears in operating relationship such that as the gears wear against each other over a period of time fragments of metal are apt to accumulate. For such gears to operate satisfactorily and with a minimum of wear, it is necessary to have present a bath of oil of sufficient volume to thoroughly splash over all of the gears as they operate at the customary speed to the extent that no portions of the gears ever run in a dry condition.

Ordinarily, such gear housings are provided with openings covered by metal plates which can be removed for inspection of the interior and replenishing the bath of oil. In equipment which is in constant operation, there must be a continuous routine inspection to be certain that there is no breakdown of the equipment. Considerable mechanic's time is involved in removing the cover from such a housing, making the inspection, and then replacing the cover. Such housings are often located in relatively inaccessible poorly lit locations and such inspection is not always dependable and even when dependable, is difficult and time consuming to make. Moreover, the inspection must always be made when the gears are not in operation, since otherwise the oil would be thrown out through the inspection hole. Obviously, in such a procedure there is no way to determine whether or not, from an accumulation of dirt and metal particles, there has been undue wear on the gears or an accumulation of dirt particles and particularly metal particles which might produce further undue wear.

It is therefore among the objects of the invention to provide a new and improved inspection device for gear housings such as a transmission case which permits visual inspection of the interior of the housing whether the gears are in operation or whether they are at rest.

Another object of the invention is to provide a new and improved dirt collector for a gear housing which is capable of gradually accumulating and holding dirt and metal particles until the cover is removed and the particles can be disposed of.

Still another object of the invention is to provide a new and improved combination inspection hole and cover therefor useful on gear housings which performs the double function, namely that of enabling inspection of the interior of the housing to determine the presence or absence of an oil bath and also that of collecting out of the oil bath unwanted metal and dirt particles.

Still another object of the invention is to provide a new and improved combination inspection plate and dirt collector which is inexpensive to manufacture, easy to install, and equally easy to remove for cleaning and replacing.

Still another object of the invention is to provide a new and improved combination inspection plate and dirt collector which is of simple construction enabling it to be made to fit virtually any size hole or contour of housing, which can operate successfully whether or not the plate may be submerged in an oil bath, and which is particularly inexpensive.

With these and other objects in view, the invention consists in the construction, arrangement, and combination of the various parts of the device, whereby the objects contemplated are attained, as hereinafter set forth, pointed out in the appended claims and illustrated in the accompanying drawings.

Figure 1:
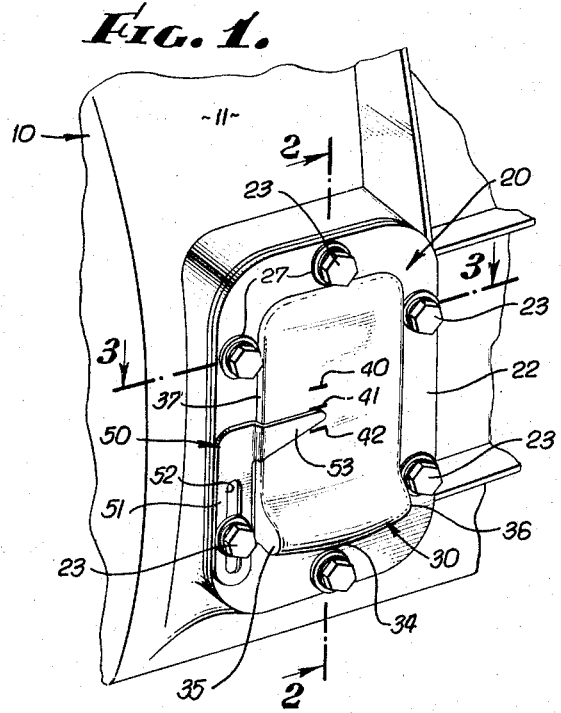
FIGURE 1 is a side perspective view of a fragment of gear housing showing an inspection plate mounted thereon.
Figure 2:
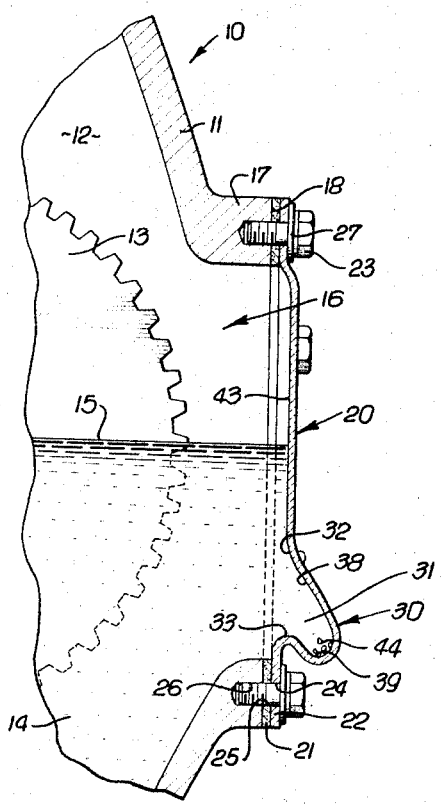
FIGURE 2 is a fragmentary longitudinal sectional view taken on the line 2—2 of FIGURE 1.
Figure 3:
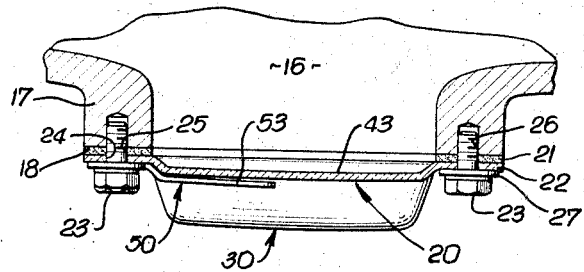
FIGURE 3 is a fragmentary cross-sectional view taken on the line 3—3 of FIGURE 1.

In an embodiment of the invention which has been chosen primarliy by way of illustration, there is shown a fragment of gear housing indicated generally by the reference character 10, one side wall 11 of which is shown encompassing a chamber 12. By way of example, this may be assumed to be a transmission case housing the customary gears like the gear 13 shown in the chamber. A bath 14 of oil is shown at rest in the chamber 12 and filling the chamber to a level 15. It is understood, of course, that the level may vary depending upon circumstances and that even though when at rest the level 15 is well below the upper portion of the gears, leaving them dry, when the gears rotate the oil is splashed by the action over all of the gears and the teeth, thereby providing adequate lubrication.

In the wall 11 is an inspection opening indicated by the reference character 16 framed by a flange 17 which is an outwardly extending portion of the wall 11. In this form of device the flange is roughly rectangular in shape, with rounded corners, and is provided at its outer face with a flat seat 18 providing a sealing area around the inspection opening.

The inspection opening is designed to be covered by means of an inspection plate indicated generally by the reference character 20. The inspection plate in the chosen embodiment is made preferably of a transparent synthetic plastic resin material which may for structural purposes be suitably reinforced with a mesh which becomes transparent when moistened with the plastic resin so that the inspection plate becomes a view plate making the interior of the chamber 12 visible from the outside. A gasket 21 which is substantially of the same shape and area as the seat 18 is compressed between the flat seat and a substantially rectangular marginal area 22 of the inspection plate. Bolts 23 extending through holes 24 in the inspection plate and matching holes 25 in the gasket and extending into tapped holes 26 in the flange 17 hold the plate in sealed relationship wtih the flange with the assistance of the washer 27.

For the purpose of collecting heavy metallic sediment and metal particles which are generated over a period of time by wear on the teeth of the gears 13, there is provided an outwardly extending protrusion indicated generally by the reference character 30. The protrusion may take any one of a number of forms, but a very acceptable and advantageous form is one wherein the protrusion extends substantially the full distance across the lower end of the inspection plate 20. The protrusion more properly consists of a pocket 31, the open side of which faces inwardly. The pocket is defined in part by a top side 32 and a bottom side 33 which are in substantially parallel relationship, although it has been found advantageous to have the top side 32 extend slightly outwardly relative to the bottom side. It has also been found advantageous to so shape the pocket 31 that a center point 34 is slightly lower than opposite ends of the pocket terminating in ends 35 and 36 of the protrusion. The ends 35 and 36, moreover, are also shown as being located approximately even with the edges of the inspection opening 16. A raised margin 37 may be provided extending around the top and sides of the plate 20 so as to give the plate an outwardly dished configuration.

Between the top side 32 of the protrusion and a bottom 39 there is provided as slope 38 which extends outwardly and downwardly in an angular direction.

When the inspection plate 20 is applied to the gear housing in the manner shown and described, the level 15 of the bath of oil can be observed from the outside when the gears are at rest and it can be determined from the mechanic's experience whether or not the bath should be replenished. If desired, marks 40, 41, and 42 may be inscribed on the outer face of the inspection plate to indicate whether or not the level 15 is at "full," and whether it is at a level where replenishment is in order or whether it is at a low or dangerous level.

When the gears are operating and the oil is being splashed about in the usual fashion, the presence of oil can of course be observed as it strikes against an inner face 43 of the inspection plate. During the course of operation of the gears over a considerable period of time, oil continuously splashes against the face 43, over the top side 32 and then down the slope 38 and into the pocket 31. As the oil is redirected from the bottom of the pocket upwardly, there is a change in velocity as well as direction and heavy dirt particles and metal particles 44 will be extracted from the oil and left behind in the bottom 39 of the pocket where they may accumulate. Should more effective retention of ferrous metal particles be desired, a permanent magnetic strip 45 may be embedded in the plate along the bottom of the protrusion and the magnetic properties of a magnetic strip of this kind will tend to retain ferrous metal particles in the pocket and, moreover, because the metal particles are thus retained, other non-magnetic dirt particles will also be entrapped with them. The plate 20 can be readily removed by removing the bolts 23. The particles 44 of dirt can then be brushed out when the inner face 43 is cleaned off prior to reapplication to the side wall of the housing.

Moreover, because of the somewhat pliable character of the plate, critical tolerances are not needed in order to assure that it is effectively sealed in position over the inspection opening. The pliable character of the plate also permits some flexibility in locating the holes 24 without in any degree impairing the effectiveness of the device. Accordingly, not only can the level of the oil bath be observed from the outside without need for removing the plate, but the amount of dirt present can also be gauged by viewing from the outside the dirt particles collected in the pocket, and this also suggests to the mechanic whether or not the chamber should be completely drained of oil and the oil replaced.

As an added feature there is provided an adjustable oil level indicator comprising a bracket 50 having a leg 51 provided with a slot 52, and a horizontal leg 53 which overlies the face of the plate 20. The leg 51 is fastened beneath one of the bolts 23 and can be adjusted up or down by use of the slot 52 so that a straight edge of the leg 53 can be located at the desired level. Though the leg 51 is shown extending upward from one of the lower bolts 23, it can also be attached to another of the bolts, as for example, one of the upper bolts and extended downwardly to adjusted position.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. In a gear housing having an inspection opening and within which gears operate in a bath of oil, an inspection plate comprising a sheet of substantially transparent material, said sheet having a view portion substantially coinciding with said opening, a sealing flange having a gasket thereon extending around and outside said view portion, a seat on the housing surrounding said opening and adapted to receive said gasket in sealing relationship, attachment means connecting said flange to said seat, and an outwardly projecting protrusion extending substantially horizontally across the lower end of said view portion, said protrusion having a pocket with an inwardly facing opening, said pocket extending outwardly relative to said sealing flange whereby during agitation of oil in said housing oil flows successively over the inner face of said plate and into said pocket.

2. In a gear housing having an inspection opening and within which gears operate in a bath of oil, a dirt collecting inspection plate comprising a sheet of substantially transparent material, said sheet having a view portion substantially coinciding with said opening, a sealing flange having a gasket thereon extending around said view portion, a seat on the housing surrounding said opening and adapted to receive said gasket in sealing relationship, attachment means connecting said flange to said seat, and an outwardly projecting protrusion extending substantially horizontally across the lower end of said view portion, said protrusion having an inwardly facing opening including a top side and a bottom side, a pocket in said protrusion extending outwardly relative to said sealing flange and having the lowermost part of the pocket at a location lower than said bottom side, the top side of said opening having an outward and downward slope whereby during agitation of oil in said housing oil flows successively over the inner face of said plate over said downward slope and into said pocket leaving dirt particles heavier than said oil to accumulate in said pocket.

3. In a gear housing having an inspection opening and within which gears operate in a bath of oil, a dirt collecting inspection plate comprising a sheet of substantially transparent moldable synthetic plastic resin, said sheet having a view portion substantially coinciding with said opening, a relatively flat sealing flange having a gasket thereon extending around and outside said view portion, a relatively flat seat on the housing surrounding said opening and adapted to receive said gasket in sealing relationship, attachment means connecting said flange to said seat, and an outwardly projecting protrusion extending substantially horizontally across the lower end of said portion, said protrusion having an inwardly facing opening including a top side and a bottom side, a pocket in said protrusion extending outwardly relative to said sealing flange and having the lowermost part of the pocket at a location lower than said bottom side, said lowermost part being lower at the center than at opposite ends, the top side of said opening having an outward and downward slope whereby during agitation of oil in said housing oil flows successively over the inner face of said plate, over said downward slope and into said pocket leaving dirt particles heavier than said oil to accumulate in said pocket.

4. In a gear housing having an inspection opening and within which gears operate in a bath of oil, an inspection plate comprising a sheet of substantially transparent material, said sheet having a view portion substantially coinciding with said opening, a sealing flange having a gasket thereon extending around and outside said view portion, a seat on the housing surrounding said opening and adapted to receive said gasket in sealing relationship, attachment means connecting said flange to said seat, and an outwardly projecting protrusion extending substantially horizontally across the lower end of said view portion, said protrusion having a pocket with an inwardly facing opening, said pocket extending outwardly relative to said sealing flange whereby during agitation of oil in said housing oil flows successively over the inner face of said plate and into said pocket, and a visual indicator bracket, said bracket comprising one leg having a vertically adjustable position relative to said attachment means and another leg overlying said plate at a selected level for said oil.

References Cited

UNITED STATES PATENTS 3,096,648  7/1963  Domebeck et al.

FOREIGN PATENTS 497,123  8/1954  Italy.

LAVERNE D. GEIGER, *Primary Examiner.*

H. S. BELL, *Assistant Examiner.*